(12) United States Patent
Depetris et al.

(10) Patent No.: US 11,097,429 B2
(45) Date of Patent: Aug. 24, 2021

(54) DEVICE FOR NON-CONTACT OBJECT HANDLING

(71) Applicant: TOUCHLESS AUTOMATION GMBH, Biel/Bienne (CH)

(72) Inventors: Fabio Depetris, Biel/Bienne (CH); Luigi Sabato, Biel/Bienne (CH)

(73) Assignee: TOUCHLESS AUTOMATION GMBH, Biel/Bienne (CH)

( * ) Notice: Subject to any disclaimer, the term of this patent is extended or adjusted under 35 U.S.C. 154(b) by 259 days.

(21) Appl. No.: 16/465,780

(22) PCT Filed: Jun. 20, 2017

(86) PCT No.: PCT/EP2017/065123
§ 371 (c)(1),
(2) Date: Dec. 17, 2019

(87) PCT Pub. No.: WO2018/099615
PCT Pub. Date: Jun. 7, 2018

(65) Prior Publication Data
US 2020/0114524 A1  Apr. 16, 2020

(30) Foreign Application Priority Data

Dec. 1, 2016 (WO) .................. PCT/IB2016/057243

(51) Int. Cl.
*B25J 15/06* (2006.01)
*B65G 47/91* (2006.01)
(Continued)

(52) U.S. Cl.
CPC ......... *B25J 15/0616* (2013.01); *B06B 1/0618* (2013.01); *B06B 1/10* (2013.01);
(Continued)

(58) Field of Classification Search
None
See application file for complete search history.

(56) References Cited

U.S. PATENT DOCUMENTS

| 3,524,085 A | 8/1970 | Shoh |
| 7,168,747 B2 * | 1/2007 | Hoehn ................... B65G 47/90 |
| | | 294/64.3 |

(Continued)

FOREIGN PATENT DOCUMENTS

| DE | 10121742 | 1/2003 |
| DE | 10 2008 036 805 | 9/2009 |

(Continued)

OTHER PUBLICATIONS

G. Reinhart et al., "Non-contact handling and transportation for substrates and microassembly using ultrasound-air-film-technology", Advanced Semiconductor Manufacturing Conference, May 16, 2011, pp. 1-6. (Year: 2011).*

(Continued)

*Primary Examiner* — Gerald McClain
(74) *Attorney, Agent, or Firm* — Nixon & Vanderhye P.C.

(57) ABSTRACT

A non-contact handling tool for picking up an object, the tool comprising an ultrasonic transducer extending between a reflective side and a picking side configured to emit ultrasounds forming, in a near field area of the picking side, an excess-pressure wave, and a fluid suction system configured to suction a fluid towards the picking side, forming in said near field area an under-pressure. The fluid suction system comprises at least a fluid suction channel disposed in the ultrasonic transducer. The transducer has a height defined between the picking side and the reflective side corresponding to a half wavelength of the ultrasounds generated in the transducer.

21 Claims, 11 Drawing Sheets

(51) Int. Cl.
   *B06B 1/10* (2006.01)
   *B06B 1/06* (2006.01)
   *B06B 1/20* (2006.01)
   *G10K 15/00* (2006.01)

(52) U.S. Cl.
   CPC ........... *B06B 1/20* (2013.01); *B65G 47/91* (2013.01); *G10K 15/00* (2013.01)

(56) References Cited

U.S. PATENT DOCUMENTS

2004/0070221 A1* 4/2004 Hoehn ............ B65G 54/00 294/188
2015/0088154 A1* 3/2015 Vaitekunas ...... A61B 17/22012 606/128

FOREIGN PATENT DOCUMENTS

| DE | 202008012449 | 4/2010 | |
| JP | 2006-73654 | 3/2006 | |
| JP | 2006073654 A | * | 3/2006 |
| WO | 2010/094275 | 8/2010 | |
| WO | 2011/009446 | 1/2011 | |

OTHER PUBLICATIONS

P. Rinck et al., "Experimental investigations on longitudinal-torsional vibration-assisted milling of Ti—6Al—4V", The International Journal of Advanced Manufacturing Technology, Jun. 22, 2020, pp. 3607-3618 (Year: 2020).*
International Search Report for PCT/EP2017/065123 dated Oct. 5, 2017, 8 pages (with English Translation).
Written Opinion of the ISA for PCT/EP2017/065123 dated Oct. 5, 2017, 8 pages.
Translation of International Preliminary Report on Patentability dated Jun. 4, 2019 in International Application No. PCT/EP2017/065123, 9 pages.

* cited by examiner

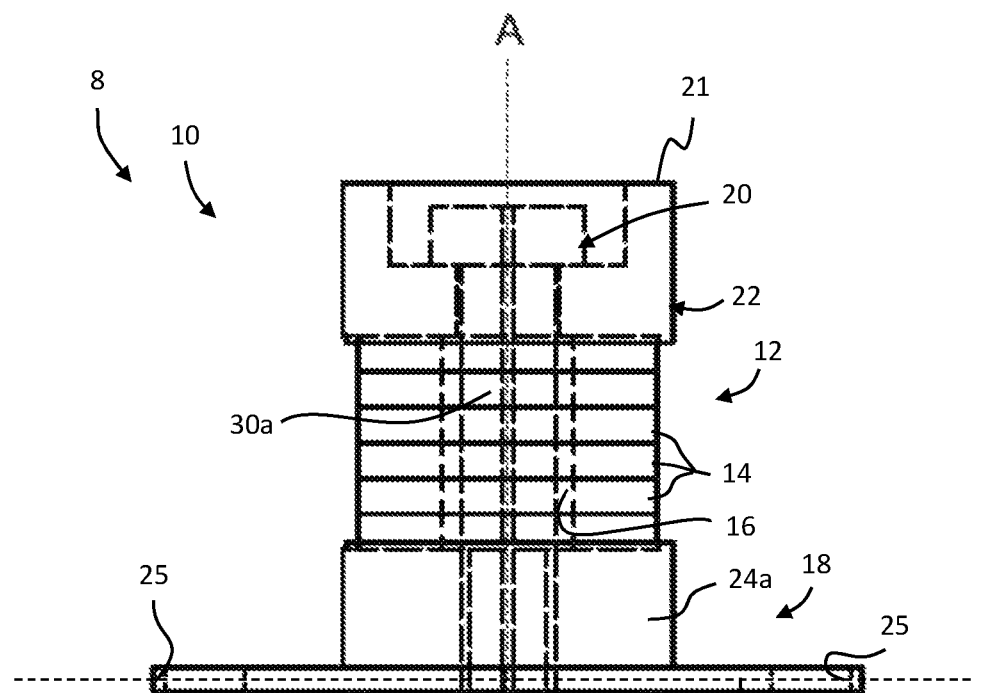
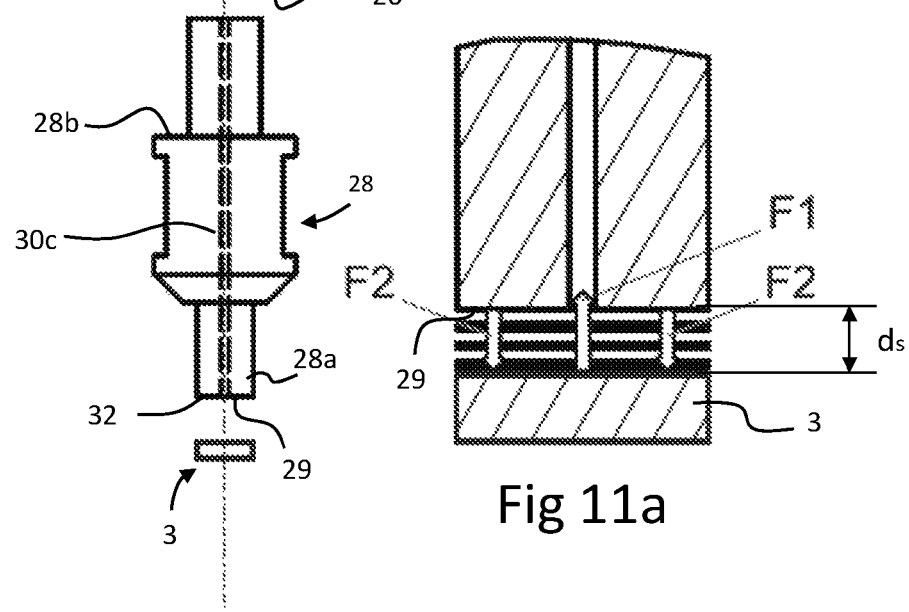
Fig 2a
Fig 11a

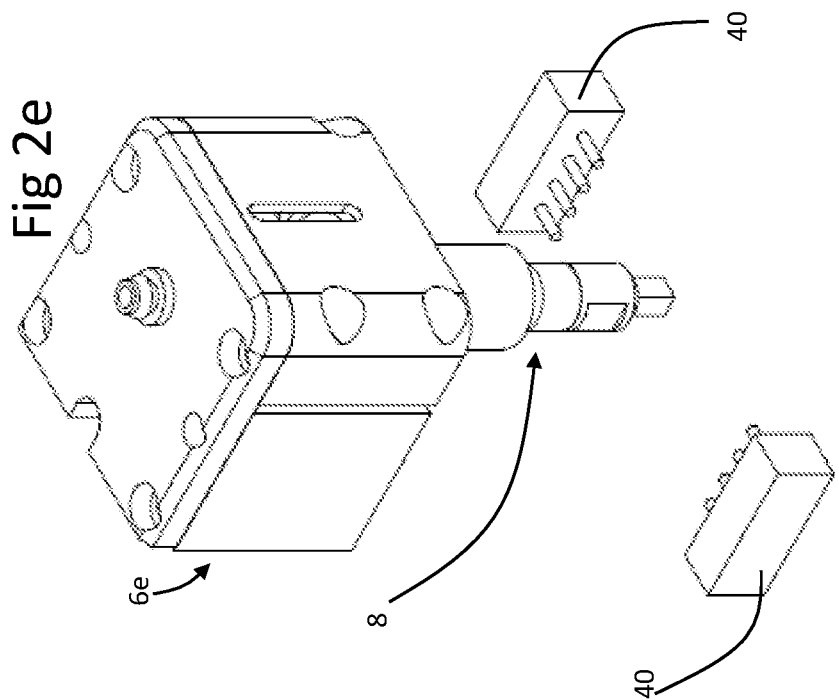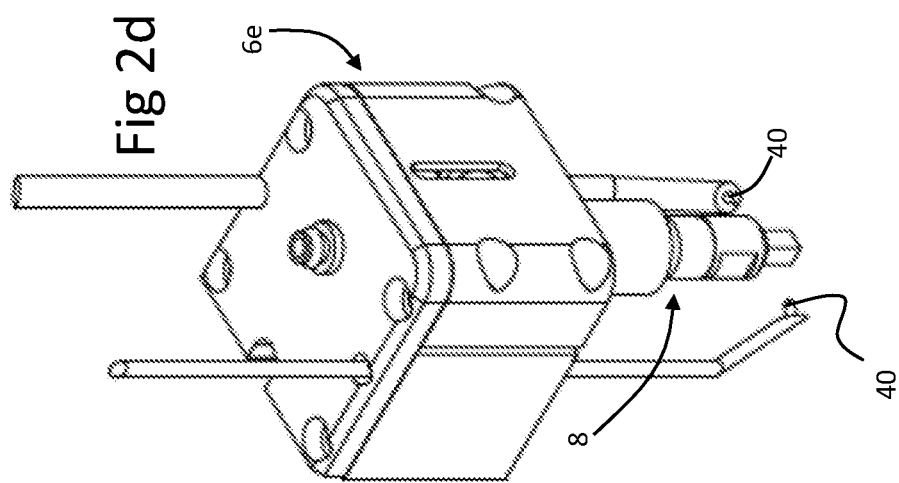

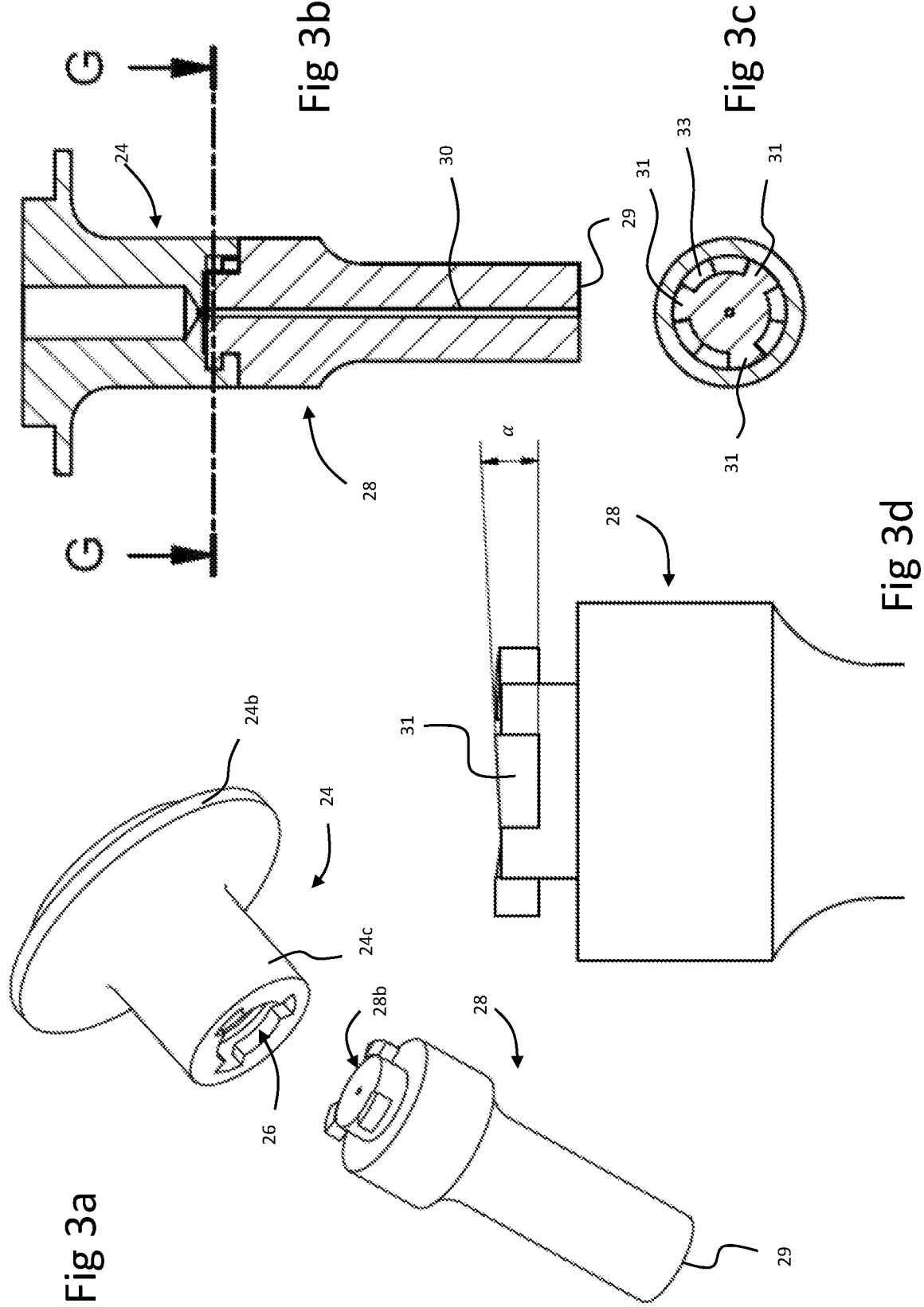

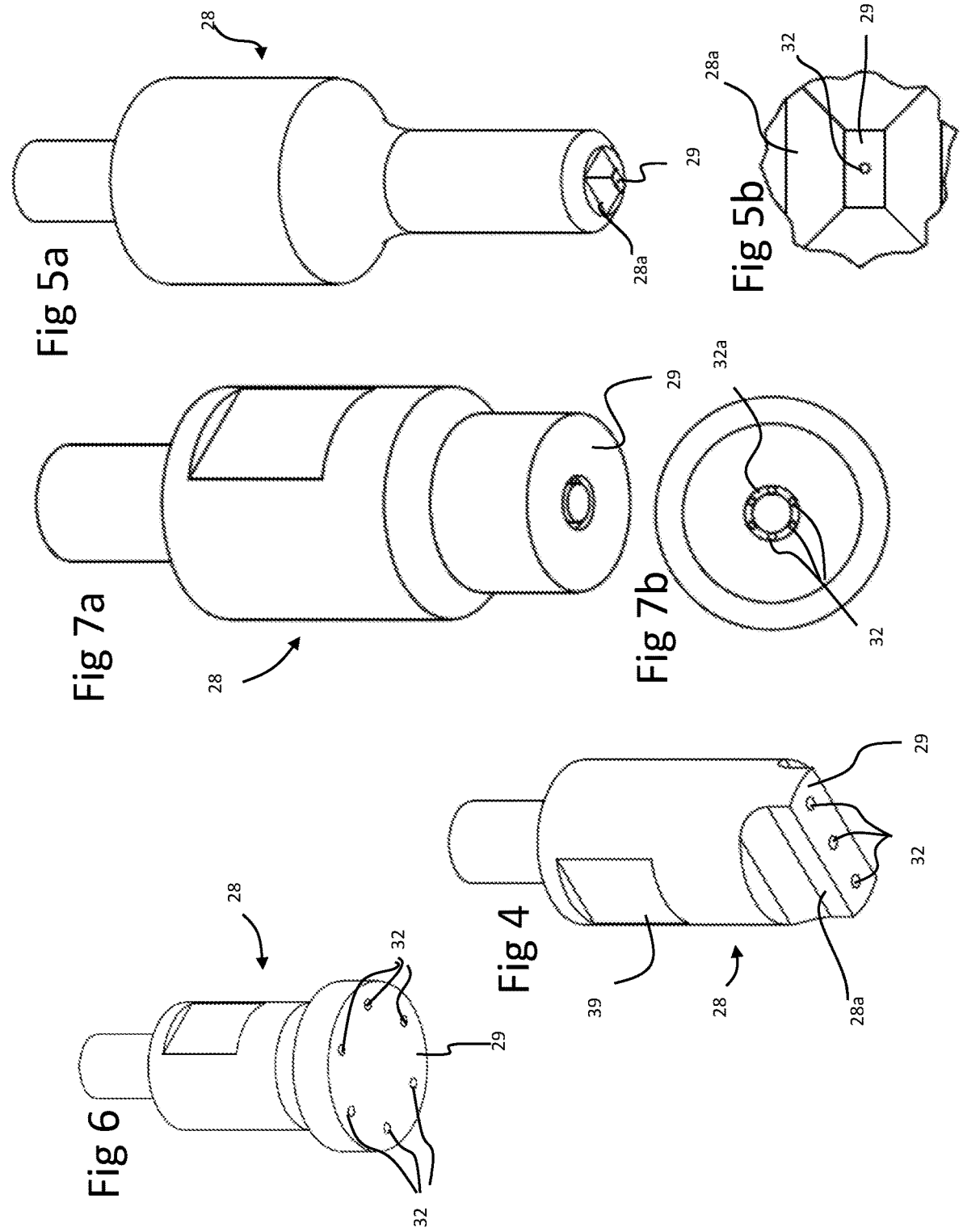

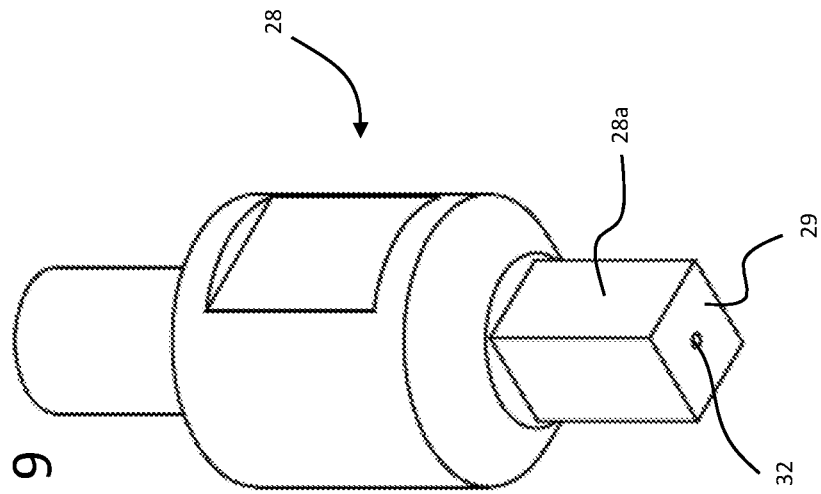
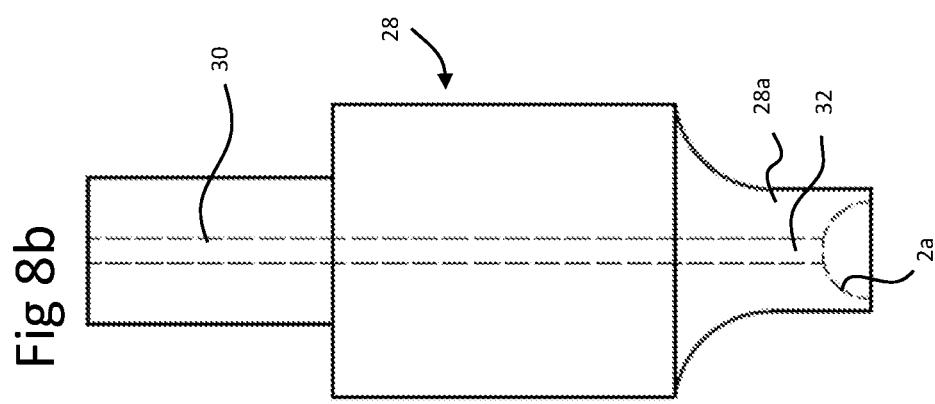
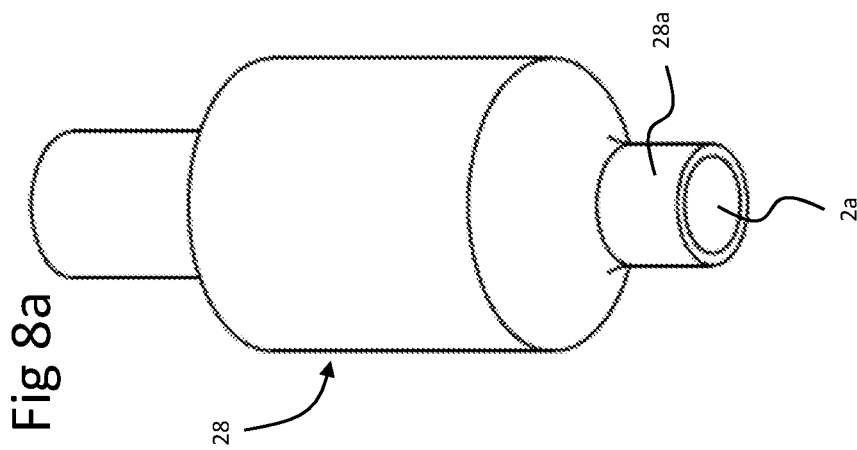

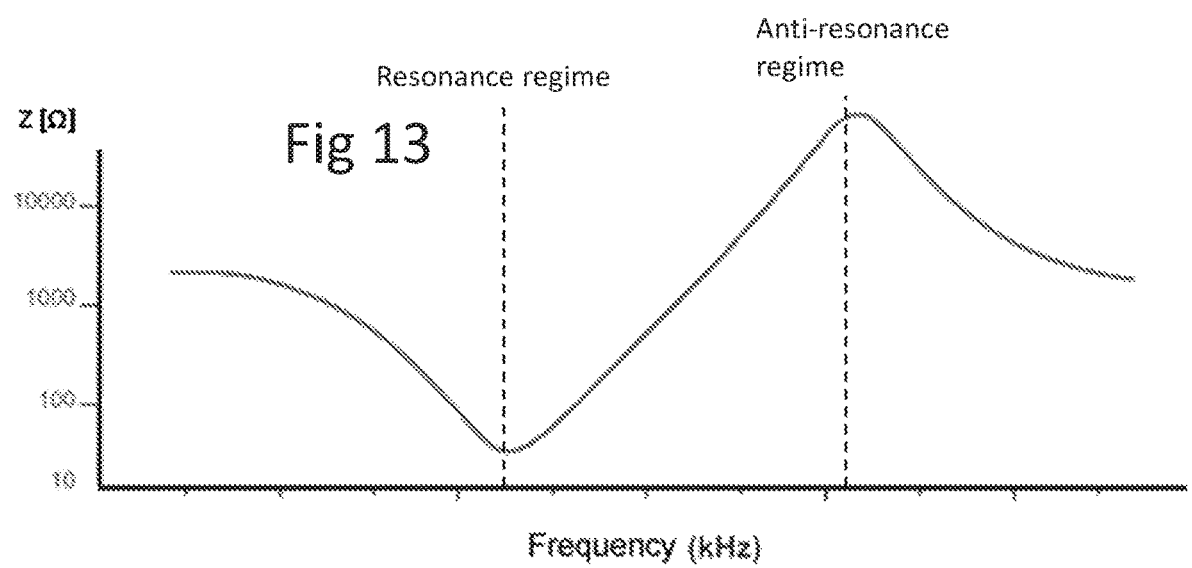
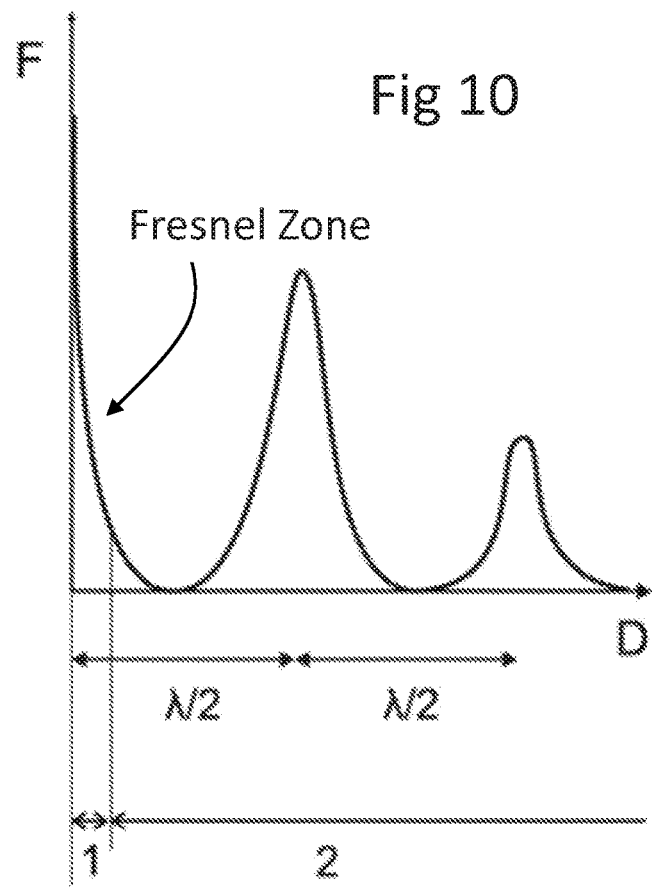

DEVICE FOR NON-CONTACT OBJECT HANDLING

This application is the U.S. national phase of International Application No. PCT/EP2017/065123 filed Jun. 20, 2017 which designated the U.S. and claims priority to International Application No. PCT/IB2016/057243 filed Dec. 1, 2016, the entire contents of each of which are hereby incorporated by reference.

TECHNICAL FIELD

The present invention relates to a device for the non-contact handling of an object. The invention more particularly relates to a device for handling small-sized objects, in particular smaller than a volume of $10^{-6}$ m$^3$ or smaller than a mass of the order of 20 g.

STATE OF THE ART

The methods called "pick and place" allow the handling of an object by using tools to carry out extremely fast-paced handlings for displacing several hundred objects per minute. "Pick and place" tools usually use suction devices called "vacuum grippers", for suctioning the object in a direction opposite to gravity, immobilising the object against the tool and thus displacing it to the required place. As for handling objects of the order of the centimetre, the purpose is to grip the object while contending the effects of gravity. For this object range, gravity is the main force which is exerted on the object, gravity being in particular much higher than the adhesion forces between the tool and the object.

However, when the size of the object is smaller, typically below $10^{-6}$ m$^3$, the gravity exerted on the object is very low and it is easy to suction up the object. On the other hand, the adhesion forces which were insignificant for larger objects, become overpowering and much stronger than gravity. Thus, when the object is pressed against the tool, it becomes difficult to detach the object from the tool due to the adhesion forces between the object and the tool. This disrupts the displacement speed and the positioning precision of the displaced object. Moreover, at this scale, every contact between the object and the suction head may damage the object by generating microparticles which can also disrupt tool operation. Thus, the suction devices are not satisfactory for handling small-sized or fragile objects.

In order to counteract the drawbacks of suction devices, there are non-contact methods where the object to be displaced levitates over or under the tool.

It is known optical levitation which enables to accelerate and suspend a particle up to $10^{-12}$ m$^3$ by applying a radiation pressure for example laser radiation. However, this type of handling should be performed in a transparent environment to optimise particle stability, the particle should imperatively be transparent and dielectric.

There also exists electric levitation which uses an electric field to counteract gravity and handle a charged or polarised object. The electric field can be replaced by a magnetic field for handling objects according to their magnetic properties. However, these two types of levitation are only applicable to objects that are sensitive to electric or magnetic fields. In addition, there is a risk that the object placed in a magnetic or electric field becomes damaged. Finally, these techniques require specific installations depending on the object to be handled.

Aerodynamic levitation uses a flow of gas, usually air, to levitate an object. In this type of levitation, we distinguish Bernoulli device air bearings. Air bearings expulse air flows from under the object to make it levitate. On the contrary, Bernoulli devices are positioned over the objects to be handled. In Bernoulli devices, the tool comprises lateral walls with the object to be handled being positioned therebetween. The tool comprises a channel which expulses compressed air onto the object. The compressed air projected on the object is evacuated by the space that exists between the walls and the object, thus, generating an attractive force opposed to the direction of compressed air, this effect is called the Bernoulli Effect. The attractive force allows maintaining the object at a distance from the tool. The main drawback of aerodynamic methods is that the levitating object has very little lateral stability.

Levitation methods using ultrasounds are also known. Methods using standing wave levitation or far field levitation are distinguished from methods using near field levitation. The transition from near field to far field occurs at a point F called natural focus. Natural focus F is a distance with respect to ultrasound wave generator surface: before F, there is mention of near field, after F there is mention of far field. In other words, if an object is levitating in a near field, it is called near field levitation, if is levitating after point F, it is said to be in far field levitation. F is defined by:

$$F=r^2/\lambda$$

where r is the radius of the surface of the part of the generator opposite the object and $\lambda$ the ultrasound wave length.

The systems using standing wave levitation require the presence of a reflector facing the ultrasonic generator. The generator emits waves that will reflect on the reflector and create equidistant nodes of $\lambda/2$ where the repulsive force is sufficient for an object to levitate. This main drawback of this technique is that handlings are restricted to the area between the generator and the reflector, and thus, solely at node level. Moreover, the object is imperatively maintained at a minimum distance from the generator, a distance of $\lambda/2$ which is the distance from the first node.

In some methods using near field ultrasound, there is no reflector facing the transmitter, as the object that levitates acts as a reflector. This method is hardly ever used as its range of application is restricted to a vertical displacement of the object, from bottom to top, by placing a transmitter under the object thereby, restraining its range of application.

Levitation methods combining ultrasound and air suction are also known and described for example in documents "Non-contact Handling and Transportation for Substrates and Microassembly Using Ultrasound-Air-Film-Technology", IEEE 2011, US2004/0070221, DE102008036805, and JP2006-073654. In these devices of the prior art, a sonotrode integrating a suction channel is coupled with a transducer, the sonotrode corresponding at least to a half wavelength, sometimes more, added to the length of the transducer corresponding at least to a half wavelength. The tools of the prior art have a length between ends of at least a wavelength of the ultrasounds generated in the body of the tool. The encumbrance of such tools for pick and place applications or for other applications for handling objects in restricted spaces, is a drawback and sometimes makes the use of such tools impossible for certain applications. Furthermore, a larger body of the tool can also impact on the performance (rapidity and precision) of robot machines bearing these tools.

BRIEF SUMMARY OF THE INVENTION

A purpose of the present invention is to propose a system for the non-contact handling of an object, particularly a millimetric or micrometric object, exempt from the limitations or minimising the limitations of known devices.

Purposes of the invention are carried out by a tool according to claim 1, 29 or 31, a system according to claim 22, and a method according to claim 25.

In the present invention, a non-contact handling tool for picking up an object is described, the tool comprising an ultrasonic transducer extending between a reflective side and a picking side configured to emit ultrasounds forming, in a near field area of the picking side, an excess-pressure wave and a fluid suction system configured to suction a fluid towards the picking side, forming in said near field area an under-pressure. The fluid suction system comprises at least a fluid suction channel disposed in the ultrasonic transducer.

According to a first aspect of the invention, a transducer height defined by a distance between the picking side and the reflective side is located within a range of 80% to 150% of a half wavelength $\lambda/2$ of ultrasounds generated in the transducer.

According to another aspect of the invention, the ultrasonic transducer includes a body and a head, arranged at one end of the body opposite the reflective side, the head comprising the picking side and being able to be separated from the body, said at least one suction channel crossing the body and the head.

According to another aspect of the invention, the ultrasonic transducer comprises at least one pair of superimposed piezoelectric members, preferably piezoceramic, said pair being screwed in the body with a bolt, the suction channel crossing the bolt.

In an advantageous embodiment, said transducer height is located within a range of 90% to 110% of a half wavelength $\lambda/2$ of ultrasounds generated in the transducer.

In an advantageous embodiment, said transducer height is less than 100 mm, preferably less than 90 mm, for example within a range of 90 mm to 20 mm.

In an advantageous embodiment, the suction channel comprises one or several suction nozzle(s) opening onto the picking side. In an alternative, the suction channel comprises one single suction nozzle opening onto the picking side, said suction nozzle being centred on the picking side. In another alternative, the suction channel comprises several suction nozzles opening onto the picking side.

In an advantageous embodiment, said at least one suction channel crosses the handling tool from the picking side to the reflective side.

In an advantageous embodiment, the ultrasonic transducer comprises an ultrasonic generator and an ultrasonic transmission device coupled with the generator, the transmission device comprising a front body fitted with a tool securing member arranged at a nodal plane of the ultrasonic waves generated in the transducer.

In an advantageous embodiment, the transmission device comprises a rear body and a biasing member, the ultrasonic generator being compressed between the front body and the rear body by the biasing member. The biasing member can in particular be a bolt, and in an advantageous embodiment, the suction channel extends through the bolt.

According to an embodiment, the ultrasonic generator can comprise a stacking of a plurality of piezoelectric rings, in particular from 2 to 6 rings.

In an advantageous embodiment, the ultrasonic transducer comprises a head interchangeably coupled with a front body of the transmission device, the picking side being arranged on the head. The tool can comprise a set of several interchangeable heads of different forms or dimensions.

In an advantageous embodiment, the head and front body comprises additional securing members in the form of a bayonet securing system.

According to embodiments, the picking side can be flat or curved, for example having a concave form, configured to be compliant with a portion of the surface of the object to be picked.

According to embodiments, the picking side can comprise a hydrophobic or lipophobic surface, in particular for liquid object picking applications.

In an advantageous embodiment, the tool may further comprise an electric discharge device for neutralising an electric charge of the object.

The surface of the picking side within the scope of the invention can be within a range of 0.1 to 1300 mm$^2$.

In an advantageous embodiment, the picking side of the tool has an identical surface size, or within a range of 90% to 110% of the surface size of the object to be picked.

In the present invention, is also described a non-contact handling system comprising the non-contact handling tool, a control unit connected to the ultrasonic generator of the ultrasonic transducer and, a suction device comprising a suction pump connected to the fluid suction channel. The control unit and the ultrasonic transducer are configured to generate ultrasounds at a frequency within a 20 kHz to 150 kHz range according to the size of the object to be handled.

In an advantageous embodiment, the control unit and the ultrasonic transducer are configured to generate ultrasounds at a frequency within a 30 kHz to 150 kHz range, and particularly within a 40 kHz to 140 kHz range.

In an advantageous embodiment, the control unit comprises a control circuit connected to the ultrasonic generator and to the suction pump for simultaneously controlling the suction power and the generation of ultrasounds.

In the present invention is now also described, a method for a non-contact handling of an object, including:
  providing a handling system according to any of the preceding claims,
  activating the suction pump to create a suction force and the ultrasonic generator to create a repulsive force, with respect to the picking side,
  placing the picking side of the handling tool facing a surface of the object,
  suspending the object at a non-null suspension distance with respect to the picking side by simultaneously monitoring the suction pump and the ultrasonic generator, the suspension distance being monitored to be in a near field area of the ultrasounds.

In an advantageous embodiment, the suspension distance of the object with respect to the picking side ranges between 1 and 80 micrometers, preferably between 1 and 60 micrometers.

An advantage of the device according to the present invention is that it uses near field ultrasounds as repulsive force. In fact, the repulsive force of the ultrasounds varies in the Fresnel zone such as to follow the relationship $1/(x^2)$ according to the distance x with the head, as illustrated on FIG. 10. This graphic illustrates that the force is at its maximum when nearest to the head, that is to say, at the near field ultrasounds (area 1 on FIG. 2), then weakens in the standing waves (area 2 on FIG. 2). The repulsive force in the near field is always higher than the force measured at nodes separate by $\lambda/2$ in the standing wave levitation area. Thus, the use of near field ultrasounds enables to use a maximum repulsive force on the object which is counteracted by an attractive force of the same order, thus enabling to obtain a maximum levitation force on the object. This improves object stability during the suspension thereof.

In an embodiment, the ultrasonic generator generates ultrasounds at a frequency between 20 kHz and 500 kHz, preferably between 40 kHz and 150 kHz according to the size of the object to pick. The frequency depends on the dimension of the object to be handled. The smaller the object is, the higher the frequency, and vice versa.

In an embodiment, the head has a diameter of around three times the diameter of the object. In an embodiment, the height h of the body-head assembly is eight times lower, for example around six times, the diameter of the shell of the object. For example, to handle an object of diameter of about 3 mm, the length of the body-head assembly is around 20 mm and the maximum diameter of the head is around 8 mm.

The term diameter has a broad definition to mean the largest dimension of the object (its shell) arranged facing the picking side of the head, and here also applies to the heads or non-circular objects in this plane.

Advantageously, it is possible to miniaturise the device of the handling system to adapt the dimensions of the body and head according to the object to be handled.

The invention operates just as well with objects exhibiting a flat surface or a spherical surface or having apertures. Particularly, the best centring or aligning results are obtained when the surface of the object facing the picking side is a continuous surface, without holes or apertures.

The object of the system has no restriction as regards size or form, it can be flat, spherical or comprise concave or convex sides or apertures. The object can be a solid object and can be constituted of all types of materials. For example, the materials are selected from among metal or metal alloys, ceramic, polyolefins, polyamides, resins such as epoxy resin, glass, silicon, plastic polymers.

For example, the object is selected from among electronic components such as semiconductors, MEMS or MOEMS type microsystems, biochips, thin-film transistors, chips or other electronic components. The object can have a glass coating, a coating machined beforehand exhibiting hollows or reliefs. The object can be a horology piece, such as pieces that compose a movement. The object can be a component used to manufacture medical devices in medical or pharmaceutical technologies. The object can be a component used to manufacture compounds for aerospace.

The object is selected from among the objects displaced by micromanipulation, handling fragile objects, handling objects without contamination.

For example, the object can have a weight of 0.1 milligrams to 10 grams and a diameter of 0.2 mm to 40 mm.

In an embodiment, the device allows maintaining a deviation (also called suspension distance) between 1 and 80 micrometers, preferably between 5 and 60 micrometers between the picking side and the surface of the object opposite to said picking side. The distance can depend on dimensions of the object, in particular the smaller the object, the shorter the distance can be.

Other advantageous objects and aspects of the invention will become apparent upon reading the detailed description of the embodiments and drawings.

BRIEF DESCRIPTION OF THE FIGURES

FIG. 2a is a lateral view of a non-contact handling tool according to an embodiment of the invention, a head of the tool being disassembled from the tool body;

FIG. 2d is a perspective view of a non-contact handling tool according to an embodiment of the invention, with a connection part of the suction system mounted on the tool and comprising an electric discharge system;

FIG. 2e is a perspective view similar to FIG. 2d, with a separate electric discharge system according to an alternative embodiment;

FIG. 3a is a perspective view of a body and a head that can be separated from a non-contact handling tool according to a first embodiment of the invention;

FIG. 3b is a sectional view in a plane crossing the axis of the assembled pieces of FIG. 3b and FIG. 3c is a sectional view according to line G-G of FIG. 3b, FIG. 3d is a detailed view of a coupling part of the head of FIG. 3a;

FIG. 4 is a perspective view of a head that can be separated from a non-contact handling tool according to a second embodiment of the invention;

FIG. 5a is a perspective view of a head that can be separated from a non-contact handling tool according to a third embodiment of the invention;

FIG. 5b is a partial detailed view of a picking side of the head of FIG. 5a;

FIG. 6 is a perspective view of a head that can be separated from a non-contact handling tool according to a fourth embodiment of the invention;

FIG. 7a is a perspective view of a head that can be separated from a non-contact handling tool according to a fifth embodiment of the invention;

FIG. 7b is a view of a picking side of the head of FIG. 7a;

FIG. 8a is a perspective view of a head that can be separated from a non-contact handling tool according to a sixth embodiment of the invention;

FIG. 8b is a lateral view of the head of FIG. 8a;

FIG. 9 is a perspective view of a head that can be separated from a non-contact handling tool according to a seventh embodiment of the invention;

FIG. 10 is a schematic graphic of the repulsive force created by an ultrasonic wave according to the distance of an emitter surface;

FIG. 11a schematically illustrates the repulsive and suction forces on an object located at a close distance from the picking side of the tool;

FIG. 13 graphically shows an electrical impedance curve according to the frequency of the generator of a transducer of a non-contact handling tool according to an embodiment of the invention.

DESCRIPTION OF THE EMBODIMENTS OF THE INVENTION

Figure 1:
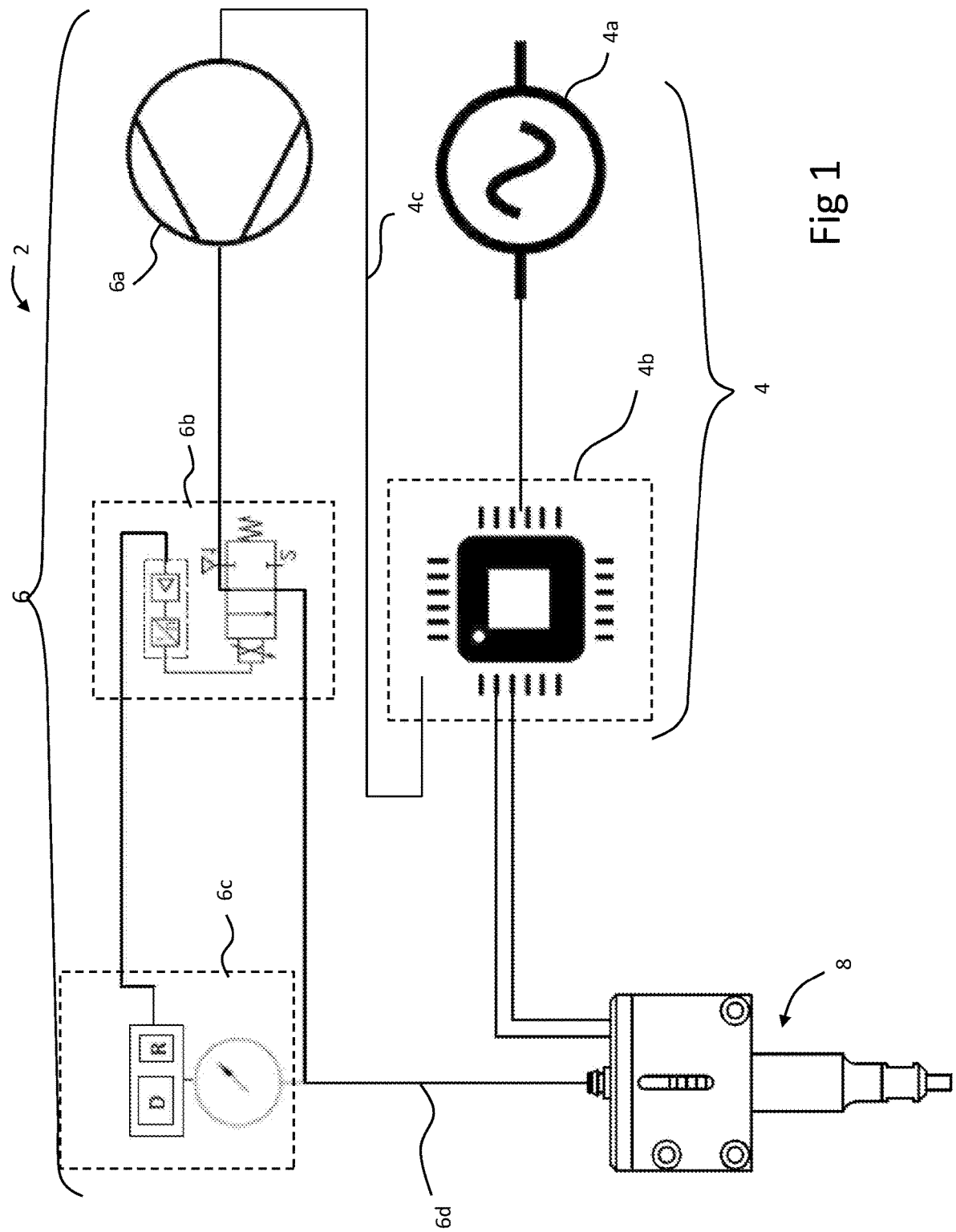
FIG. 1 is a schematic view of a system for the non-contact handling of an object according to an embodiment of the invention.
Figure 2B:
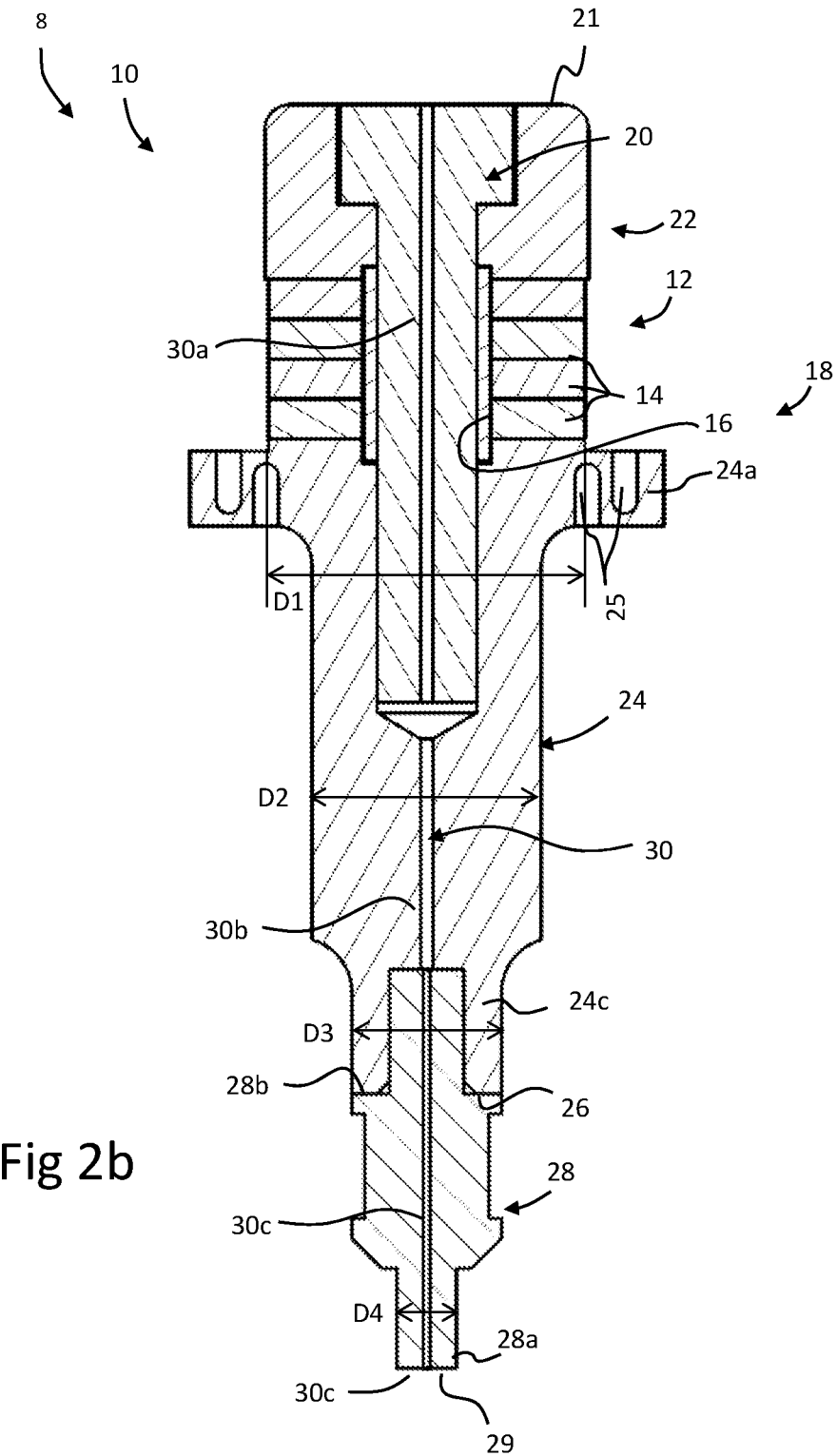
FIG. 2b is a sectional view of a non-contact handling tool according to an embodiment of the invention, showing the head assembled to the body.

In reference to the figures, in particular FIGS. 1, 2a and 2b, a handling system 2, according to an embodiment of the invention, is illustrated. The handling system 2 is particularly configured for picking and placing an object 3 without entering in direct contact with the object. The handling system 2 according to embodiments of the invention is configured for handling small objects, in particular objects having a mass less than 20 grams, or even less than 10 grams. The handling device 2 according to embodiments of the invention is highly advantageously configured for handling very small objects and in particular objects having a mass less than 1 g right down to 0.01 milligrams.

The non-contact handling system according to embodiments of the invention is particularly configured to be integrated in an assembling machine, in particular a robot for assembling micro-components in a product manufacturing chain. Examples of non-exhaustive applications comprise:
- picking-placing on a circuit board small electronic components such as semiconductors, MEMS or MOEMS type microsystems, biochips, thin-film transistors, chips and other electronic components;
- picking small electronic components for various operations such as inspection, quality control and packaging;
- handling micro-mechanical pieces for small engines;
- handling horology pieces, such as pieces that compose a movement, the face, hands, appliques, the glass, for example for assembling pieces, handling pieces after diamond polishing, surface treatment or for quality control and inspection;
- handling components used for manufacturing aerospace compounds;
- handling components used for manufacturing medical devices;
- handling components used in medical or pharmaceutical technologies.
- handling small living organisms, for example found in a droplet of liquid, embryos, nematodes in and out of water. In many applications where the micro-components have masses below 10 g, or even below 1 gram, for assembling in products of small volume or inside restricted volumes, the encumbrance of the handling tool is very important. In fact, the lower the tool encumbrance, the more versatile the use of the tool is and particularly for placing products in restricted spaces, restricted openings and other constraints regarding displacing a tool with respect to other tools or product parts in which the components are assembled.

Furthermore, reducing the size and mass of the tool allows for a more rapid displacement since the tool inertia is reduced, thereby increasing tool handling performance, for example for assembling components.

The use of a non-contact handling system helps preventing issues pertaining to contact handling tools, among which:
- risk of damaging the component
- adhesion issues of a small object and not being able to release the object easily,
- difficulty in picking and placing a small object with sufficient precision and control,
- risk of contaminating the component.

According to an embodiment, the non-contact handling system 2 comprises a control unit 4, a suction device 6, and a non-contact handling tool 8. The suction device comprises a suction pump 6a coupled with the handling tool by a channel 6d for suctioning a fluid, particularly gas through the non-contact handling tool. The suction device can further comprise a regulating valve 6b and a monitoring unit 6c comprising a pressure sensor and a user interface, for example for displaying the suction pressure or for entering a setpoint for controlling the suction device 6. The control unit comprises a power supply and a control circuit 4b with a microprocessor for monitoring an ultrasonic generator in the handling tool as will be described in further detail hereinafter. The control unit can also be connected 4c to the suction system, particularly the suction pump 6a and/or the regulating valve 6b. The control unit particularly allows to monitor the picking and releasing of the object 3 by the non-contact handling tool 8.

The non-contact handling tool 8 comprises an ultrasonic transducer 10 to create a repulsive force on the object 3, and a suction system to create an attractive force on the object 3, the attractive and repulsive forces can be balanced so as to suspend the object at a non-null suspension distance $d_s$ from one end forming a picking side 29 of the tool. The attractive and repulsive forces can be varied by the control unit 4 so as to pick the object, displace it and release it at the required place.

Figure 2C:
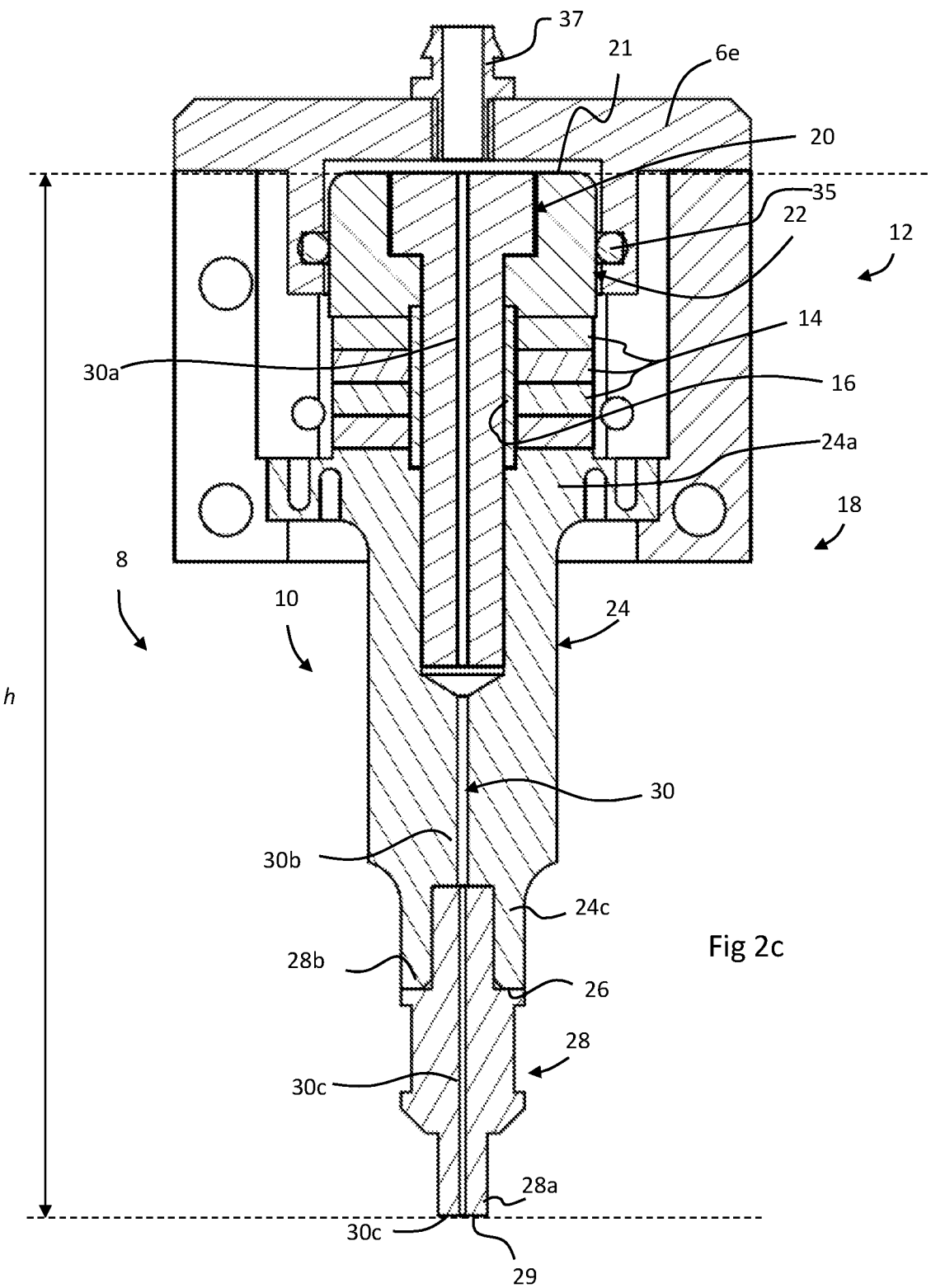
FIG. 2c is a sectional view of the non-contact handling tool according to FIG. 2b, with a connection part of the suction system mounted on the tool.

The suction system comprises a suction channel 30 crossing the handling tool 8 coupled at an end 21 to the suction device 6 and opening onto the other end 29 by one or several suction nozzle(s) 32. In one embodiment, such as illustrated on FIG. 2c, the suction device comprises a connector 6e, for example in the form of a cover mounted on the end 21 of the transducer and comprising a sealing member 35, for example comprising an O-ring, encircling the rear body 22 of the transducer. The connector 6e comprises an inlet, for example in the form of a beak 37, to connect a pipe to the suction pump.

The ultrasonic transducer 10 comprises a vibration generator 12 and a transmission device 18 coupled to the generator 12. In the illustrated example, the generator 12 comprises a stacking of piezoelectric members 14, preferably piezoelectric rings made of ceramic, sandwiched between a rear body 22 and a front body 24 of the transmission device 18. A biasing member 20, for example in the form of a bolt, crosses central orifices 16 of the piezoelectric rings 14. The biasing member is configured to apply a tensile force between the rear body 22 and the front body 24 causing a compression force that acts on the stacking of piezoelectric rings sandwiched between these two bodies.

Electric signals provided by the control circuit 4 to the electrodes of the piezoelectric members allow generating a periodical axial expansion of the piezoelectric members 14 to generate ultrasonic waves in the transmission device 18. The main operating principle of an ultrasonic transducer 10 with piezoelectric members (particularly ceramic piezoelectric) sandwiched between a rear body and a front body is known per se. Within the framework of the invention, it is however possible to use other forms of ultrasonic transducers in as far as the latter are capable of generating the required repulsive forces for a non-contact picking of the object by taking into account the applied suction force. In the illustrated example, the generator advantageously comprises a stacking of two to six ceramic piezoelectric rings 14, the piezoelectric rings with axial ends being oriented such that the neutral electrodes are oriented respectively towards the rear body 22 and the front body 24.

The transmission device 18 comprises the rear body 22, the front body 24, and the biasing member 20, which can be in particular a bolt traversing the rear body 22 and the stacking of piezoelectric rings 14 sandwich arranged between the rear body 22 and the front body 24. The rear body 22 acts as a reflector for the ultrasonic waves generated, the front body transmitting the waves towards a head 28 arranged at the picking end of the transmission device 18.

The head 28 comprises a terminal portion 28a with a picking side 29 forming the picking side placed facing the object 3 to be picked. The terminal portion 28a comprises the suction nozzles 32 connected to the suction channel 30 and which open onto the picking side 29. The ultrasonic waves generated by the generator 12 are emitted by the picking side 29.

Figure 11B:
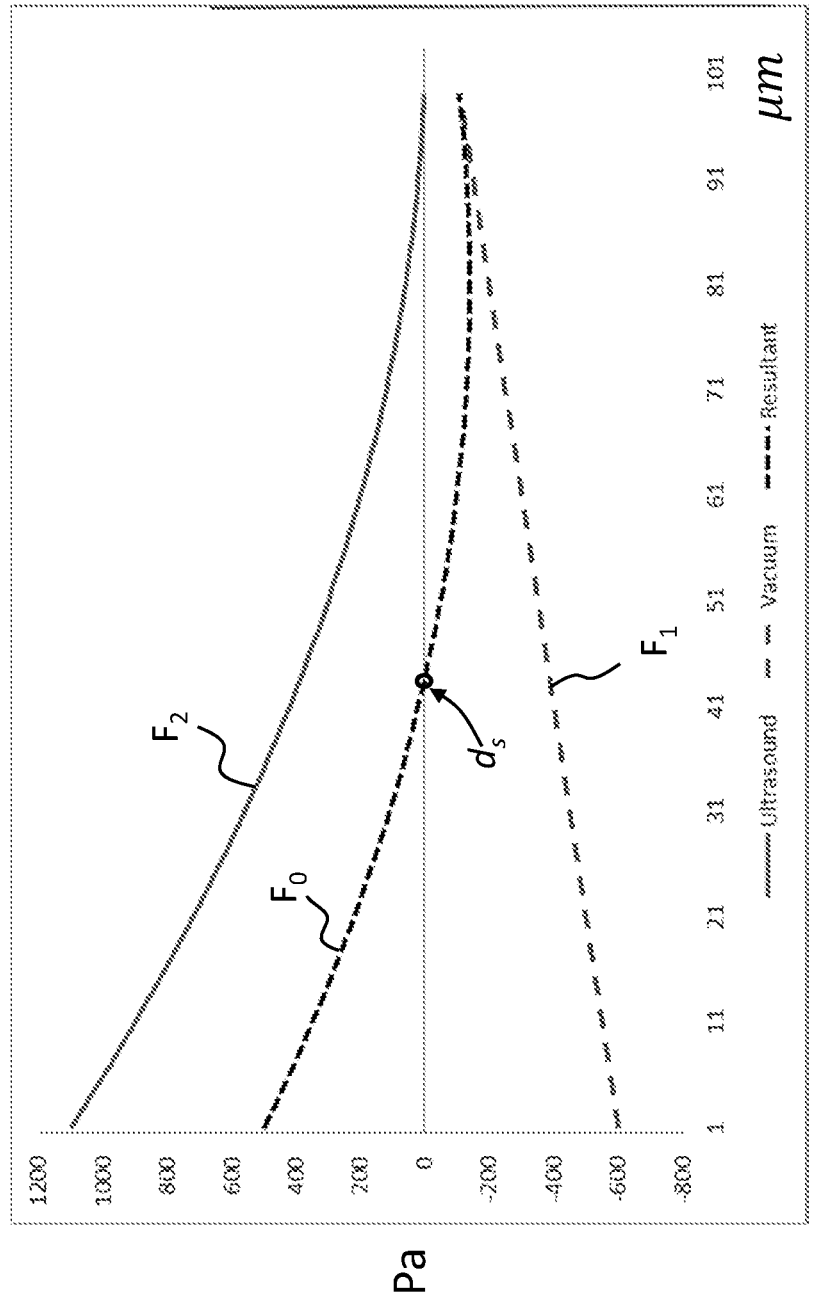
FIG. 11b illustrates a graphic showing the repulsive force the result of ultrasonic waves as well as the suction force on an object according to the distance separating the object from the tool picking side.

As illustrated on FIGS. 11a and 11b, the ultrasonic waves generate excess pressure pertaining to the general ambient pressure, creating a repulsive force F2 on the object 3, whereas the fluid suction by the suction nozzle 32 generates an under-pressure relative to the general ambient pressure, create an attractive force F1 on the object 3. The suction force F1 increases when the distance between the object and the picking side 29 decreases. However, the repulsive force F1 generated by the ultrasounds increases when the distance between the object and the picking side 29 decreases.

The repulsive force is illustrated on FIG. 10. When in the near field area (called acoustic Fresnel zone), namely zone 1 where the distance separating the object from the picking side 29 is much lower than $\lambda/4$, $\lambda$ being the wavelength of the generated ultrasound, the repulsive force increases rapidly substantially corresponding to an increase according to the function. The growth characteristic of the suction force according to the distance between the surface of the object 3 and the picking side 29 is less pronounced such that there is an equilibrium suspension distance $d_s$ where the suction force F2 is equal to the repulsive force F1 plus the object weight (see FIG. 11b).

In embodiments of the invention, the equilibrium distance $d_s$ between repulsive and attractive forces according to the mass and the surface of the object is typically between 1 μm and 80 μm.

Here is an example of a component to be handled and the parameters by way of example

| Component | surface | mass | Force to lift |
|---|---|---|---|
| Wheel of a watch | 16 [mm^2] | 14 [mg] | 13.72 [mN] |

| Pressure at 40 [μm] suspension distance | |
|---|---|
| Suction force on a surface of 4 [mm^2] <= 13.72 [mN], | $Pv = \frac{Force}{Area} = \frac{13.72 \ [mN]}{4[mm^{\wedge}2]} = 3.34[kPa]$ |
| Repulsive force by ultrasound on a surface of 12 [mm^2] <= 13.72 [mN] | $Pus = \frac{Force}{Area} = \frac{13.72 \ [mN]}{12[mm^{\wedge}2]} = 1.14 \ [kPa]$ |

By making these two values vary the suspension distance ds can be changed for example:
- if the suction pressure <3.34 [kPa] the suspension distance is higher than 40 μm
- if the repulsive pressure by ultrasound <1.14 kPa the suspension distance is lower than 40 μm.

These values are typical for components that are smaller than 5 mm.

In a preferred embodiment, the head 28 of the transmission device 18 can advantageously be in the form of a part that can be separated from the front body 24, as illustrated on FIGS. 2a-9. This allows to change the head 28 depending on the object 3 to be handled. In fact, in order to obtain a stable auto-centring of the object 3 with respect to the non-contact handling tool 8, it is advantageous that the surface of the picking side 29 has a form and size identical to the form and size of the surface of the object 3 facing said picking side 29, or within a range of 80% to 300% of the size of the surface of the object 3 facing said picking side 29. A meshing such as a plate 39, allows the head to be screwed onto and unscrewed from the front body.

The lateral stability is mainly determined by the fluid flow around the object towards the suction nozzle or nozzles 32, the under-pressure acting on the object being configured by the suction nozzle or nozzles to be of maximum amplitude towards the centre of the picking side 29.

On the other hand, the excess pressure generated by the near field ultrasounds preferably has a substantially constant amplitude characteristic over the entire picking side 29 so as to ensure that the surface of the object 3 facing the picking side 29 be stabilised in a substantially parallel position to this picking side 29. Thus, results in lateral stability leading to the object being centred with respect to the axis A of the handling tool, as well as stability against the object rotating around an axis orthogonal to the axis A. This allows maintaining the side of the object facing the picking side 29, at a very low constant suspension distance $d_s$, particularly lower than 80μ, more particularly lower than 50μ. The very high stability and the very short equilibrium distance (suspension distance) $d_s$ allow to pick and place the object in an extremely precise manner.

Figure 12A:
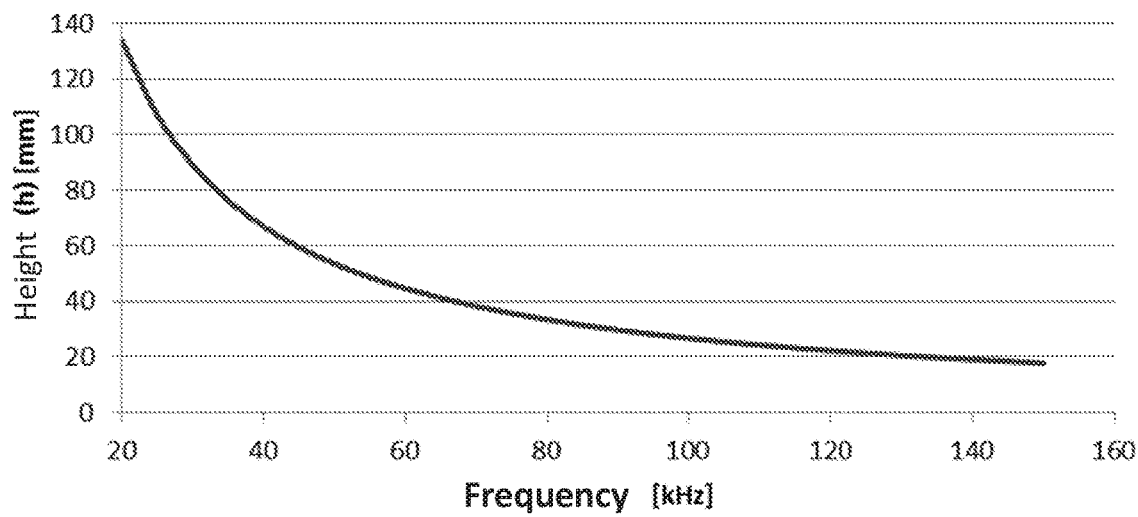
FIG. 12a is a graphic illustrating the relationship between the transducer height according to the resonance frequency of the transducer.

The ultrasonic transducer 10, according to the invention, comprises a height h between the end corresponding to the reflective side 21 of the rear body 22 and the end corresponding to the picking side 29, substantially equivalent to a half wavelength $\lambda/2$ of the ultrasounds generated inside the ultrasonic transducer 10. The wavelength of the ultrasounds generated in the transducer depends on the materials that form the transducer, as the wavelength depends on the acoustic velocity in the concerned environment. The materials forming the transducer typically comprise aluminium alloys or titanium (or even magnesium) for the front body and the head, and steel for the rear body (which reflects waves) and ceramic for piezoelectric members. The acoustic velocity in aluminium is around 6200 m/s, whereas the acoustic velocity in the air is 343 m/s. A transducer with a front body and an aluminium head, as well as a piezoceramic generator, operating at a resonant frequency of 50 kHz, has a wavelength of around 100 mm, while the ultrasound wavelength emitted at the picking side in the air is around 7 mm. The range of materials that can be used for generating ultrasounds is currently rather limited (aluminium, magnesium, titanium) and the acoustic velocities in these materials are comparable, such that the relationship between the frequency and the height of the transducer is close or equivalent to the relationship illustrated on FIG. 12a. For an operational frequency of the transducer of 40 kHz, the height h of the transducer is around 60 mm, whereas for an operational frequency of 140 kHz, the height h of the transducer is around 20 mm.

In alternative embodiments according to the invention, the height h can be within a range of 80% to 140% of said half wavelength $\lambda/2$, in particular within a range of 90% to 110% of said half wavelength $\lambda/2$.

In devices from the prior art, a sonotrode is coupled to the transducer, the sonotrode corresponding to at least a half wavelength (sometimes more) and the transducer corresponding at least to a half wavelength, the tools of the prior art having a length between the ends of at least a wavelength of the generated ultrasounds. The encumbrance of such tools for applications in restricted spaces, in particular for handling very small components (particularly having masses less than 10 g, or less than 1 g), is a drawback and can, according to the application, make the use of such tools impossible.

In the invention, the integration of the suction system directly in a handling tool provided with the transducer allows for a more compact solution, having a height corresponding to the half wavelength of the ultrasounds generated in the transducer.

In the invention, the front body 24 as well as the biasing member 20 (the bolt in the example illustrated) and the ultrasonic generator 12 are designed to amplify the amplitude of the generated ultrasounds while keeping a low as possible height and integrating the suction system 30, 32, 6e. To this end, the front body 24 comprises two, three or more diameter reductions configured to amplify the vibrations axially A, by minimising radial and lateral vibrations (orthogonal to the axial direction), in order to ensure creating an ultrasonic pressure wave that is stable and uniform at the picking side 29. In an embodiment where there are at least three diameter reductions, for example as illustrated on FIG. 2b, the ratios between the successive diameters D1, D2, D3 and D4 in decreasing order are found in one range
for D1/D2, between max 2.6 and min 1.1
for D2/D3, between max 2.6 and min 1.1
for D3/D4, between max 6 and min 1.1 and preferably within a range:
for D1/D2, between max 1.6 and min 1.4
for D2/D3, between max 1.6 and min 1.3
for D3/D4, between max 5 and min 1.2

In an embodiment where there only two diameter reductions in the front body, the ratios between successive diameters D1, D2 and D3 in decreasing order are preferably found in one range
for D1/D2, between max 2.6 and min 1.3
for D2/D3, between max 5 and min 1.2

In an embodiment where there are four or more diameter reductions in the front body, the ratios between the successive diameters D1, D2, D3, D4 and D5 in decreasing order can follow the hereinabove relationships, the subsequent ones are found between max 6 and min 1.1.

Figure 12B:
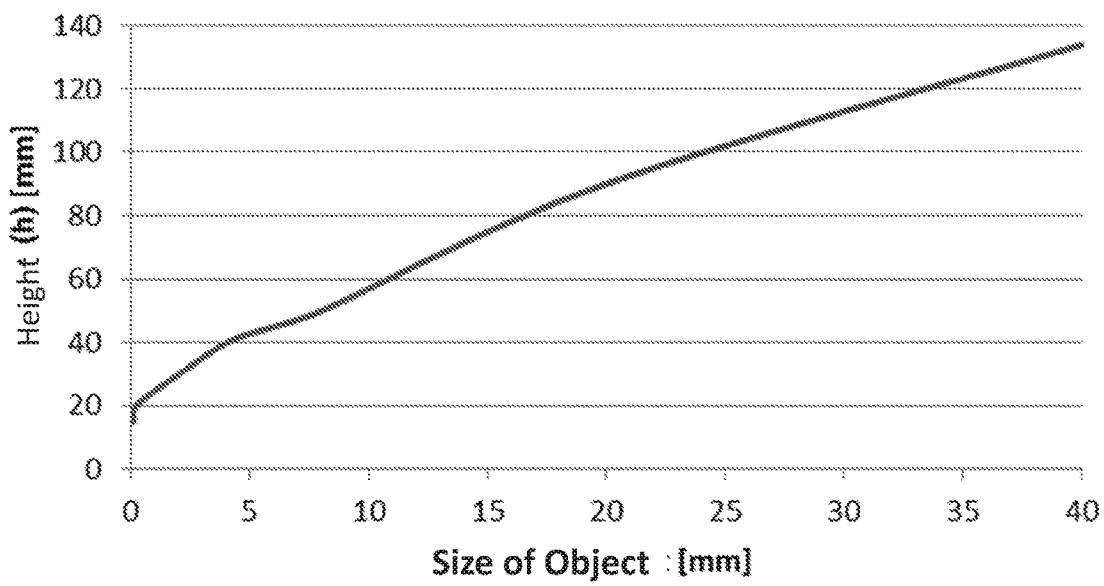
FIG. 12b is a graphic illustrating the relationship between the transducer height according to the size of the object to be picked.

In a preferred embodiment, in order to decrease the tool encumbrance, the non-contact handling system is configured to generate ultrasounds within a frequency range of 30 to 500 kHz, preferably between 40 and 140 kHz according to the size of the object to handle. The height of the tool and the frequency used can be defined according to the object to be handled. As illustrated on FIG. 12b, the smaller the object, the less the height of the tool and the higher the frequency. In conventional systems, transducers typically operate within a range of 20 to 40 kHz whereas in the present invention the combination of a high frequency such as 80 kHz and a tool having a height of half a wavelength $\lambda/2$ allows to reduce from 4 to 8 times the height of the handling tool with respect to conventional tools. In this respect, the fact of working with near field ultrasounds for the repulsive force allows to reduce the suction force as well as the power required to generate ultrasounds. Furthermore, in the invention, the nodal plane P, namely the plane or the amplitude of the wave generated by the transducer is minimum ($\pm 0$), can be configured to be arranged in the front body 24 of the transmission device 18.

A securing member, such as a securing flange 24b, can be advantageously arranged in the position of the nodal plane P for securing the tool to the robot arm or to another machine member for displacing the handling tool. In an embodiment, the securing member 24b can advantageously comprise a coupling amortising the body 24, configured to soften the residual vibrations in the nodal plane P. In the example illustrated on FIG. 2c, the amortising coupling comprises notches 25 in the flange 24b to provide some elasticity (softness) between the outer rim and the body.

The suction channel 30, in an embodiment, can advantageously be arranged along the central axis A of the handling tool, the channel having a section 30b crossing the front body and a section 30a traversing the bolt 20 for coupling to the suction device 6. For a low height handling tool, for example less than a height of 60 mm, this is particularly advantageous as it facilitates the coupling of the suction device to the tool. However, in alternative embodiments it is also possible to arrange the channel in a different way in the body of the handling tool so that it is not central with a radial inlet in the tool body, the only critical function of the channel being the way the suction nozzle or nozzles 32 are arranged with respect to the picking side 29 of the head 28.

In an embodiment, the tool comprises a suction nozzle opening onto the picking side, said suction nozzle being centred on the picking side.

In other embodiments, the tool comprises several suction nozzles opening onto the picking side, said suction nozzles being arranged for example around the centre of the picking side. Examples are illustrated on FIGS. 6 to 7b. A groove 32a can advantageously be arranged in the picking side 29 in the nozzle 32 position such as to better spread the pressure of the gas flow suctioned around the centre of the picking side. This prevents the under-pressure being overly localised around the nozzles 32. An example is illustrated on FIG. 7a, 7b.

Other configurations can be implemented according to the geometry of the object to be picked and the hydrodynamic flow of fluid around the object to be picked. The nozzles are configured to ensure an under-pressure profile allowing to attract the object towards the central axis A of the transmission device in order to stabilise the object laterally with respect to the picking side.

In an embodiment, the head 28 can comprise a terminal portion 28a configured for the suspension of a drop of liquid, the nozzle or nozzles being configured to create a stream of air or gas around the drop, managing the substantially spherical shape of the drop and to arrange on the picking side 29 a hydrophobic layer to repel the drop when it is near or comes in accidental contact with the picking side.

In an embodiment, the head 28 and the front body 24c comprise additional securing members in the form of a bayonet securing system as illustrated on FIGS. 3a to 3d. The bayonet securing system comprising spurs 31 on one of the pieces which inserts into an additional groove 33 of the other piece, such as illustrated on FIGS. 3a to 3d. Securing by bayonet allows for a rapid change of the head, and furthermore ensures a precise angular orientation (around the central axis A) of the head with respect to the front body 24 of the handling tool. In fact, the head can, in some alternative embodiments, comprise a non-axisymmetric picking side, for example square (see FIG. 9), rectangular (see FIGS. 4 to 5b), oval, polygonal, or other forms according to the object to be handled.

The head 28, in an alternative, can also be secured to the front body 24 by means of threaded coupling. Other securing means, known per se, can also be used in the tool according to the invention.

The handling tool can advantageously comprise a set of several interchangeable heads of different dimensions and forms so that the head can be changed according to the object to be handled. However, for some applications, it is worth noting that the front body and head can be integral in the form of a single piece part.

According to an embodiment, the control unit 4 and the generator 12 can be configured for generating vibrations at anti-resonant frequencies, namely at forced frequencies which do not correspond to a resonant frequency of the ultrasonic transducer 10. FIG. 13 graphically shows an electric impedance curve according to the frequency of the ultrasonic generator, illustrating a minimum impedance point of the resonant regime and a maximum impedance point of the anti-resonant regime (forced regime). The advantage of this operating mode and this configuration is to create a stable variation. In a resonant system, the low impedance requires a high current and induces a strong deformation of the structure which generates some instability. In order to generate the forced anti-resonant vibrations at positions where the impedance is high or even in the zones where impedance is at its maximum, a high voltage is necessary for obtaining the vibration amplitude required for generating ultrasounds, although with a low current. Vibrations in this zone are more stable as the structure vibrates in a solid manner leading to a better stability for monitoring the repulsive force of the generated ultrasounds. In fact, by using forced vibrations, it becomes easier to vary and manage the repulsive force of the ultrasounds in the near field. An advantage of a system using forced vibrations is that the picking side 29 vibrates with a greater flatness than for a resonant regime, thereby, improving picking stability because of the more flat repulsive wave pressure.

In an embodiment, the non-contact handling system can further comprise an electric discharge device 40 (see FIGS. 2d and 2e) in order to eliminate the static charge of objects. The electric discharge device 40 can be separated from the handling tool 8 (FIG. 2e), or integral to the handling tool (FIG. 2d). The elimination of electric charge of the objects enables to better monitor the forces acting on the object, in particular in order to eliminate the forces generated by the object's static charge. This can also be very advantageous to manage the equilibrium distance well between the object and the picking side of the tool, thereby increasing the object picking and placing precision by the handling system.

In an embodiment, the non-contact handling tool can further comprise a position sensor for measuring the position, and particularly the distance of the object with respect to the picking side. The sensor can be in the form of an optical, inductive, capacitive or Hall effect sensor arranged on the picking side or around or beside the picking side. In an embodiment, the position sensor is arranged in the centre of the picking side, the handling tool comprising a plurality of suction nozzles arranged around the sensor. The sensor can be connected to the control circuit of the control unit for monitoring the forces acting on the object, particularly the suction force by monitoring for example the power of the suction pump or a valve on the suction channel, and/or by monitoring the power of emitted ultrasounds. This can also be very advantageous to manage the equilibrium distance between the object and the picking side of the tool thereby, increasing the picking and placing precision of the object by the handling system. The position of the object with respect to the picking side can also be measured by means of one or several cameras that are not integral to the handling tool.

However, it is worth noting that monitoring the suspension distance $d_s$ can also be carried out without a position sensor according to some embodiments, in particular by monitoring the suction under-pressure, thus, by monitoring the suction pump 6a or the valve 6b, according to the pressure measurement given by the pressure sensor 6c.

Taking the direction of the gravity force as reference, it is worth pointing out that the object 3 can be picked and handled by being arranged underneath the picking side 29, but also above the picking side, or even in any other orientation. The vertical direction illustrated on the figures hence does not necessarily correspond to the direction of the gravity force as the handling tool according to the invention can suspend an object in all orientations due to the auto-centring carried out by the suction force with respect to the picking side.

LIST OF REFERENCES object 3
non-contact handling system 2
control unit 4
  supply 4a
  control circuit 4b
    connection to the suction device 4c
suction device 6
  suction pump 6a
  regulating valve 6b
  monitoring unit 6c
  connection line 6d
  suction connector $6^e$
    sealing member 35
    beak 37
non-contact handling tool 8
ultrasonic transducer 10
  generator 12
    stacking of piezoelectric rings 14
      central orifice 16
  transmission device 18
    biasing member 20
      bolt
    rear body 22
      reflective side 21
    front body 24
      rear part 24a
        generator interface
        securing flange 24b
        notches 25
      part of the head 24c
        head interface 26
        groove 33
    head 28
      terminal portion 28a
      picking side 29
      body coupling interface 28b
      spur 31
      meshing 39
  suction channel 30
    suction nozzle(s) 32
      groove 32a
nodal plane of the transducer P
Axis A
Transducer height h

The invention claimed is:

1. A non-contact handling tool for picking up an object, the tool comprising an ultrasonic transducer extending between a reflective side and a picking side configured to emit ultrasounds forming, in a near field area of the picking side, an excess-pressure wave and a fluid suction system configured to suction a fluid towards the picking side, forming in said near field area an under-pressure, wherein the fluid suction system comprises at least a fluid suction channel disposed in the ultrasonic transducer, the fluid suction channel comprising one or more suction nozzles opening on to said picking side, and wherein the transducer has a height (h) defined between the picking side and the reflective side located within a range of 80% to 140% of a half wavelength λ/2 of the ultrasounds generated in the transducer, the ultrasonic transducer comprising an ultrasonic generator and an ultrasonic transmission device coupled to the generator, the transmission device further comprises a rear body and a bolt, the ultrasonic generator being compressed between the front body and the rear body by the bolt, the suction channel extending through the bolt.

2. The non-contact handling tool according to claim 1 wherein said height is less than 90 mm.

3. The non-contact handling tool according to claim 1 or 2, wherein the suction channel comprises one or several suction nozzle(s) opening onto the picking side.

4. The non-contact handling tool according to claim 1 further comprising an electric discharge device for neutralising an electric charge of the object.

5. The non-contact handling tool according to claim 1, wherein the front body comprises at least two successive diameter reductions D1, D2, D3 in the direction of the ultrasonic generator towards the picking side, the ratios between the successive diameters D1, D2, D3 in said direction is found in one range:

for D1/D2, between max 2.6 and min 1.1
for D2/D3, between max 6 and min 1.1
and for any additional reduction between max 6 and min 1.1.

6. The non-contact handling tool according to claim 1, wherein said at least one suction channel crosses the handling tool from the picking side to the reflective side.

7. The non-contact handling tool according to claim 1 wherein the transmission device comprises a front body fitted with a tool securing member arranged at a nodal plane of the ultrasonic waves generated in the transducer.

8. The non-contact handling tool according to claim 7 wherein the ultrasonic generator comprises a stacking of a plurality of piezoelectric rings.

9. The non-contact handling tool according to claim 1 in conjunction with an object to be picked up, wherein the picking side of the tool has a surface size within a range of 90% to 110% of the surface size of the object to be picked up.

10. The non-contact handling tool according to claim 1 wherein the ultrasonic transducer comprises a head interchangeably coupled to a front body of the transmission device, the picking side being arranged on the head.

11. The non-contact handling tool according to claim 10 wherein the head and front body comprises additional securing members in the form of a bayonet securing system.

12. A non-contact handling system comprising a non-contact handling tool according to claim 1, a control unit connected to an ultrasonic generator of the ultrasonic transducer and, a suction device comprising a suction pump connected to the fluid suction channel, the control unit and the ultrasonic transducer being configured to generate ultrasounds at a frequency within a 20 kHz to 150 kHz range.

13. The non-contact handling system according to claim 12, wherein the control unit comprises a control circuit connected to the ultrasonic generator and to the suction pump for simultaneously controlling the suction power and the generation of ultrasounds.

14. A method for the non-contact handling of an object, including:

providing a handling system according to claim 1,
activating the suction pump to create a suction force and the ultrasonic generator to create a repulsive force, with respect to the picking side,
placing the picking side of the handling tool facing a surface of the object at a distance within a range of 0.5 to 6 times the suspension distance $d_s$,
suspending the object at a non-null suspension distance between 1 and 80 micrometers with respect to the picking side by simultaneously monitoring the suction pump and the ultrasonic generator, the suspension distance being monitored to be in a near field area of the ultrasounds.

15. The handling method according to claim 14, wherein the ultrasonic transducer is configured and monitored to generate ultrasounds at a frequency within a 20 kHz to 150 kHz range.

16. The handling method according to claim 14, wherein said suspension distance ranges between 5 and 50 micrometers.

17. The handling method according to claim 14, wherein the transducer is operated at a forced anti-resonant frequency.

18. A handling tool for the non-contact handling of an object (3), the tool comprising an ultrasonic transducer and at least a suction channel, the ultrasonic transducer including:

a body and a head, said head being at one end of said body and comprising a picking side intended to be positioned facing the object to be handled, the body comprising a reflective side for ultrasounds positioned at the end of the body opposite the head, the head and the body being able to be separated, and an ultrasonic generator arranged to generate near field ultrasounds that exert a repulsive force to move the object away from the head;

said at least one suction channel traverses the body and the head, said suction channel being arranged to guide the suction which exerts an attractive force to bring the object near to the head in the direction opposite to that of the repulsive force, such that in the simultaneous presence of near field ultrasounds and suction, the object is maintained at a non-null suspension distance ($d_s$) from the picking side wherein the handling tool comprises a set of several interchangeable heads of different dimensions;

the ultrasonic generator comprising at least one pair of superimposed piezoelectric members, said pair being screwed in the body with a bolt, the suction channel extending through the bolt.

19. The tool according to claim 18 wherein the front body comprises at least two successive diameter reductions D1, D2, D3 in the direction of the ultrasonic generator towards the picking side, the ratios between the successive diameters D1, D2, D3 in said direction is found in one range:

for D1/D2, between max 2.6 and min 1.1
for D2/D3, between max 6 and min 1.1 and for any additional reduction between max 6 and min 1.1.

20. A handling tool for the non-contact handling of an object, the tool comprising an ultrasonic transducer and at least a suction channel, the ultrasonic transducer including:

a body and a head, said head being at one end of said body and comprising a picking side intended to be positioned facing the object to be handled, the body comprising a reflective side for ultrasounds positioned at the end of the body opposite the head, and an ultrasonic generator arranged to generate near field ultrasounds that exert a repulsive force to move the object away from the head;

said at least one suction channel crosses the body and the head, said suction channel being arranged to guide the suction which exerts an attractive force to bring the object near to the head in the direction opposite to that of the repulsive force, such that in the simultaneous presence of near field ultrasounds and suction, the object is maintained at a non-null suspension distance from the picking side, the ultrasonic generator comprising at least one pair of superimposed piezoelectric members, said pair being screwed in the body with a bolt, the suction channel extending through the bolt.

21. The tool according to claim 20 wherein the front body comprises at least two successive diameter reductions $D1$, $D2$, $D3$ in the direction of the ultrasonic generator towards the picking side, the ratios between the successive diameters $D1$, $D2$ and $D3$ in said direction is found in one range: for $D1/D2$, between max 2.6 and min 1.1 for $D2/D3$, between max 6 and min 1.1 and for any additional reduction between max 6 and min 1.1.

* * * * *